United States Patent
Kapchie et al.

(10) Patent No.: US 11,998,022 B2
(45) Date of Patent: Jun. 4, 2024

(54) AERATED SHELF-STABLE DAIRY-BASED READY-TO-DRINK BEVERAGE

(71) Applicant: SOCIETE DES PRODUITS NESTLE S.A., Vevey (CH)

(72) Inventors: Virginie Kapchie, Ada, MI (US); Philippe Rousset, Echallens (CH); Alexander A. Sher, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 17/043,095

(22) PCT Filed: Apr. 15, 2019

(86) PCT No.: PCT/EP2019/059688
§ 371 (c)(1),
(2) Date: Sep. 29, 2020

(87) PCT Pub. No.: WO2019/206722
PCT Pub. Date: Oct. 31, 2019

(65) Prior Publication Data
US 2021/0022360 A1  Jan. 28, 2021

Related U.S. Application Data

(60) Provisional application No. 62/698,495, filed on Jul. 16, 2018, provisional application No. 62/661,746, filed on Apr. 24, 2018.

(30) Foreign Application Priority Data

Aug. 10, 2018  (EP) .................................. 18188397

(51) Int. Cl.
*A23C 9/154* (2006.01)
*A23C 9/152* (2006.01)
*A23C 9/156* (2006.01)
*A23F 5/24* (2006.01)
*A23L 2/38* (2021.01)

(52) U.S. Cl.
CPC ............ *A23C 9/154* (2013.01); *A23C 9/1522* (2013.01); *A23C 9/156* (2013.01); *A23F 5/243* (2013.01); *A23L 2/38* (2013.01)

(58) Field of Classification Search
CPC ..... A23C 9/152; A23C 9/1524; A23C 9/1526; A23C 11/02
See application file for complete search history.

(56) References Cited

U.S. PATENT DOCUMENTS

2008/0286421 A1 * 11/2008 DeLease ................... A23L 2/54
426/570
2010/0112147 A1   5/2010 Barnard et al.
2017/0105435 A1 *  4/2017 Zheng ....................... A23L 2/52

FOREIGN PATENT DOCUMENTS

WO   WO-2016066788 A1 *  5/2016 .......... A23C 9/1524
WO       2017063942       4/2017
WO   WO-2017211971 A1 * 12/2017 ............. A23C 11/06
WO       2018001999       1/2018

OTHER PUBLICATIONS

Hartman, L.R., "Food Manufactures Find Success with Starches", 2017, Food Processing, https://www.foodprocessing.com/articles/2017/food-manufacturers-find-success-with-starches/ (Year: 2017).*
Bates, A.T., "Malt, the forgotten flavor and nostalgic treat", 2013, Milwaukee Journal Sentinel, http://archive.jsonline.com/features/food/malt-the-forgotten-flavor-and-nostalgic-treat-b9979120z1-222699631.html (Year: 2013).*

* cited by examiner

*Primary Examiner* — Jeffrey P Mornhinweg
*Assistant Examiner* — Kelly P Kershaw
(74) *Attorney, Agent, or Firm* — K&L Gates LLP (57) ABSTRACT

A packaged product containing essentially a ready-to-drink dairy based shelf-stable beverage composition is disclosed. The beverage provides a pleasant aerated texture by hand shaking.

20 Claims, 3 Drawing Sheets

AERATED SHELF-STABLE DAIRY-BASED READY-TO-DRINK BEVERAGE

CROSS REFERENCE TO RELATED APPLICATIONS

The present application is a National Stage of International Application No. PCT/EP2019/059688, filed on Apr. 15, 2019, which claims priority to U.S. Provisional Patent Application No. 62/661,746, filed on Apr. 24, 2018, U.S. Provisional Patent Application No. 62/698,495, filed on Jul. 16, 2018, and European Patent Application No. 18188397.6, filed on Aug. 10, 2018, the entire contents of which are being incorporated herein by reference.

TECHNICAL FIELD

The invention relates to a dairy-based ready-to-drink beverage, specifically a packaged ambient dairy-based beverage that may exhibit a stable and smooth aerated texture after shaking.

BACKGROUND OF THE INVENTION

Any reference to prior art documents in this specification is not to be considered an admission that such prior art is widely known or forms part of the common general knowledge in the field.

Dairy-based beverages are popular drinks amongst the consumers, because they are viewed as healthier alternatives to sparkling sodas, with nutritious properties thanks to their protein and mineral content, and are well accepted by consumers who find water too bland.

Aerated beverages are appreciated for their indulgent texture and/or mouthfeel. However, this texture depends strongly on a beverages gas dispersion properties, such as bubble size and distribution, and the origin of the bubbles. The bubbles may originate for instance from gasification with carbonic gas, or from fermentation with yeasts generating carbonic gas.

Over the recent years, ready-to-drink dairy-based beverages have gained a significant popularity. Such ready-to-drink dairy-based beverages may be shelf-stable at ambient temperatures, for instance during 3 months at temperatures ranging from 15° C. to 35° C. In order to avoid biological spoilage, such beverages typically undergo heat treatments, which have a strong impact on stability, and may provoke gelation, syneresis and other undesirable physical evolution over shelf life. Specific stabiliser systems have been developed in order to avoid or to mitigate such physical evolution. These beverages are not aerated.

Experience shows that usually, the stabiliser systems used to reach a required shelf-life after a specific heat-treatment depend on the recipe of the ready-to-drink dairy-based beverage, such as macronutrient content (e.g. protein, carbohydrate, lipids), total solids, pH, and/or micronutrient content (vitamins and minerals in particular).

The inventors have found that there exist several coffee-flavoured milk beverages. However, these beverages either have a very watery mouth-feel or have a very thick texture. Watery beverages do not bring the satisfaction of a milk drink, while thick beverages are not perceived as very refreshing or as thirst quenching.

Recently, ranges of chilled coffees were successfully launched, for example in Europe. A good example of such a product is a chilled dairy coffee product with a good foamability upon shaking by hand. However, these products have a short shelf-life of about a month at chilled temperatures. There are several shortcomings to this, including the need to maintain the cold distribution chain at all times, including during transportation and storage. These products cannot be stored at ambient temperatures for an extended time.

US 2007/0178213 A1 relates to a stirred-style aerated yogurt that can be consumed as a flowable beverage. An aerating gas, nitrogen, is integrated into the product.

U.S. Pat. No. 4,374,155 relates to a drinkable yogurt and milk preparation.

Based thereon, it was the objective of the present invention is to improve the state of the art.

Clean label is a growing trend in the food industry as more and more consumers look for natural ingredients, transparency and purity. This can be translated by a simple label list with fewer and familiar ingredients, less processed food as well as with authentic and transparent packaging. As the sector of ready-to-drink beverages has one of the best forecasts within the food and beverage category, it is of significant importance to find technical solutions to remove ingredients that are not accepted by consumers and to reduce the number of ingredients that are perceived as artificial.

According to the current clean label trend, there is an urgent need to find natural solutions to replace the most commonly used synthetic texturizing/stabilizing systems such as, for example carboxymethyl cellulose, or blends of microcrystalline and carboxymethyl celluloses. The new clean label solutions should provide consumer preferred sensorial characteristics including excellent visual appearance, taste, texture and/or mouthfeel but without compromising shelf life stability of the beverages. This is an extremely difficult task because currently available clean label hydrocolloids have limited functionality and cannot provide the full range of required characteristics.

The new solutions should address consumer needs by providing clean label beverages with improved quality and stability during product shelf life and unique sensorial aerated texture and/or mouthfeel characteristics after shaking.

The inventors have found it desirable to overcome or ameliorate at least one of the disadvantages of the prior art, or—at least—to provide a useful alternative. For example, the inventors have set themselves to create a dairy-based product which is shelf-stable under ambient conditions and which can provide a pleasant aerated beverage upon shaking. Further, for example, the dairy-based product should be free from chemically modified gums.

SUMMARY OF THE INVENTION

To this end, a first embodiment of the invention proposes a dairy-based shelf-stable ready-to-drink beverage composition free from chemically modified gums comprising high acyl gellan gum in an amount in the range of 0.01-0.120 weight-% (for example 0.01-0.045 weight-%), and starch in an amount in the range of 0.5-5 weight-% (for example 1.5-5 weight-%, for further example 1.0 to 2.0 weight-%, for still further example 1.0-5 weight-%).

The dairy-based shelf stable ready-to-drink beverage composition may be provided in a closed container with a headspace, wherein the headspace represents from 15 to 40 vol. %, 18 to 35 vol. % or 20 to 35 vol. % of the volume of the container.

One embodiment of the present invention is such a dairy-based shelf-stable ready-to-drink beverage composition, wherein the composition comprises dairy proteins in an amount in the range of 1.5-5 weight-% (for example 1.5-2 weight-% for further example 2-5 weight-%), sugar in an amount in the range of 0-5.5 weight-%, cocoa in an amount in the range of 0.5-2 weight-%, gellan gum in an amount in the range of 0.01-0.120 weight-% (for example 0.01-0.045 weight-%), starch in an amount in the range of 0.5-5 weight-% (for example 1.0-5 weight-%, for further example 1.5-5 weight-%), and water for the remaining weight-%.

Another embodiment of the present invention is such a dairy-based shelf-stable ready-to-drink beverage composition, wherein the composition further comprises locust bean (carob gum) in amounts ranging from 0 to 0.25 weight-%, pectin in amounts ranging from 0 to 1 weight-% and/or guar gum in amounts ranging from 0 to 0.2 weight-%.

A further embodiment of the present invention is such a dairy-based shelf-stable ready-to-drink beverage composition, wherein the composition comprises dairy proteins in an amount in the range of 1.5-5 weight-% (for example 2-5 weight-%), barley malt extract in an amount in the range of 0.5-1.5 weight-%, sugar in an amount in the range of 0-5.5 weight-%, cocoa in an amount in the range of 0.5-2 weight-%, gellan gum in an amount in the range of 0.01-0.120 weight-% (for example 0.01-0.045 weight-%), starch in an amount in the range of 0.5-5 weight-% (for example 1.0-5 weight-%, for further example 1.5-5 weight-%), and water for the remaining weight-%.

A further embodiment of the present invention is such a dairy-based shelf-stable ready-to-drink beverage composition wherein said beverage composition comprises from
- 1.5-4 weight-% (for example 2-4 weight-%) of dairy proteins
- 0 to 4 weight-% of milk fat;
- 0 to 5.5 weight-% of added sugar;
- 0.5 to 1.5 weight-% coffee (for example liquid coffee, for further example liquid cold brew coffee);
- 0.01 to 0.120 weight-% (for example 0.01 to 0.045 weight-%) of high acyl gellan gum;
- 0.5 to 5 weight-% starch (for example 1.0-5 weight-%, for further example 2 to 5 weight-% starch, for still further example 1 to 2 weight-% starch);
- optionally a buffering agent in the range of 0.01 to −0.20 weight-%; and the remainder to 100 weight-% of water. The liquid coffee may have a total solids content between 10 and 13%. At least part of the dairy proteins and the milk fat may be in the form of milk, for example whole milk or skimmed milk.

The present invention also extends to a process for preparing such a dairy-based shelf-stable ready-to-drink beverage composition comprising the following steps:
a. Mix dairy proteins, starch, high-acyl gellan gum and all other ingredients;
b. Homogenize the mixture at a total pressure in the range from 135-300 bars and at a temperature in the range from 60-80° C.;
c. Fill the homogenized mixture into a container and close the container;
d. Retort the filled and closed container at a temperature in the range from 110-130° C. 115-125° C. or 120-122° C. for a time in the range of 5-25 min, 10-20 min, or 13-17 min;
e. Allow the retorted container to cool a temperature below 35° C., below 30° C. or below 25° C.

In another embodiment, the present invention also extends to a process for preparing dairy-based shelf-stable ready-to-drink beverage composition comprising the following steps a. Mix dairy proteins, starch, high-acyl gellan gum and all other ingredients;
b. Pre-heat the mixture to a temperature in the range of 50-100° C., 55-90° C. or 60-80° C.;
c. Sterilize the pre-heated mixture at UHT conditions at 135-170° C., 135-160° C. or 135-150° C. for 2-60 seconds, 3-45 seconds or 3-30 seconds;
d. Homogenize the mixture at total pressure ranging from 135-300 bars and temperature ranging from 60-80° C.;
e. Allow the UHT treated composition to cool to a temperature below 35° C., below 30° C. or below 25° C.; and
f. Aseptically fill UHT treated beverages in aseptic containers.

These and other aspects, features and advantages of the invention will become more apparent to those skilled in the art from the detailed description of embodiments of the invention, in connection with the attached drawings.

DETAILED DESCRIPTION OF THE INVENTION

As used in the specification, the word "comprising" is to be construed in an inclusive sense, that is to say, in the sense of "including, but not limited to", or "containing, but not limited to", as opposed to an exclusive or exhaustive sense. On the contrary, the words "consisting of" are to be construed in an exclusive sense, that is to say in the sense of "limited to" except for impurities ordinarily associated with an ingredient for instance. The words "consisting essentially of" limit the scope of a claim to the specified materials or steps, and those that do not materially affect the basic and novel characteristic(s)" of the claimed invention.

As used in the specification, the word "about" is to be understood to apply to each bound in a range of numerals. Moreover, all numerical ranges should be understood to include each whole integer within the range.

As used in the specification, the singular forms "a", "an", and "the" include plural referents unless the context clearly dictates otherwise.

Unless noted otherwise, all percentages in the specification refer to weight percent (noted weight-%).

The term "aroma" is defined as an odour, sensed through the nose and retronasally, and also through the back of the mouth where the nasal and mouth cavities are interlinked.

The term "taste" is defined as the sense experienced by the tongue and describes sensations of saltiness, sweetness, sourness, bitterness or umami.

The term "flavour" is defined as a combination of both aroma and taste.

The term "dairy-based composition" is defined as a composition comprising at least one dairy protein such as casein, micellar casein, whey proteins and/or a combination thereof, and/or proteins derived from milk such as sodium caseinate, calcium caseinate.

The term "composition free from chemically modified gums" and "natural" as suggested defines food ingredient obtained from source without chemical treatment and is defined in ISO/TS 19657 "Definitions and technical criteria for food ingredients to be considered as natural", first edition issued December 2017.

The term "dairy protein" is defined as a protein obtained or derived from a dairy source. Typical dairy proteins may be selected from the group consisting of casein, micellar casein, caseinate, casein hydrolysate, whey, whey proteins, whey hydrolysate, whey concentrate, whey isolate, milk protein concentrate, milk protein isolate, micellar casein, sodium-, potassium- and/or calcium-caseinate, sweet whey, acid whey, α-lactalbumin, β-lactoglobulin, bovine serum albumin, acid casein, α-casein, β-casein and/or γ-casein, or combinations thereof.

The term "dairy" is an indication that a compound is obtained from or based on milk or milk products.

"Milk" is the normal mammary secretion of milking animals obtained from one or more milkings without either addition to it or extraction from it, intended for consumption as liquid milk or for further processing.

A "milk product" is a product obtained by any processing of milk, which may contain food additives, and other ingredients functionally necessary for the processing.

A food is "shelf-stable" if it is of a type that can be safely stored at room temperature in a sealed container for a longer term. This includes foods that would normally be stored refrigerated but which have been processed so that they can be stored at ambient temperature for a longer term. For example, a food is shelf-stable if it can be stored for at least 6 months at 4° C., for at least 6 months at 20° C., for at least 6 months at 25° C., or for at least 6 months at 30° C. A "food" means any substance, whether processed, semi-processed or raw, which is intended for human consumption, and includes drink, chewing gum and any substance which has been used in the manufacture, preparation or treatment of "food" but does not include cosmetics or tobacco or substances used only as drugs.

The term "ready-to-drink beverage composition" is defined as a packaged beverage sold in a prepared form, ready for consumption A composition is considered "free from chemically modified gums" if less than weight-%, 2 weight-%, 1 weight-5, 0.5 weight %, or none of the gums in the composition are chemically modified.

"Shaking" shall mean to move or sway with short, quick, irregular vibratory movements for at least 3 seconds, 5 seconds, 10 or 15 seconds. Shaking can be carried out with the help of machinery or by hand.

"UHT conditions" are food processing conditions suitable for sterilizing a liquid food product, for example a dairy based beverage by heating it above 135° C.—the temperature required to kill spores in milk—for 1 to 2 seconds.

An "aseptic beverage" refers to a beverage which is prepared and filled under aseptic conditions into a container or a beverage which is prepared, filled into a container and then sterilized.

"Shelf life" refers to the period of time after production of the beverage, during which the beverage is transported, and stored in retailers' or consumers' shelves, before consumption. The aseptic beverage may have a shelf life of at least 1, at least, 2 or at least 3 months at ambient temperature.

"Ambient" temperature ranges from 15° C. to 38° C., for example from 18° C. to 25° C.

"Chilled" temperature ranges from 1° C. to 8° C., for example from 3° C. to 5° C.

Unless defined otherwise, all technical and scientific terms have and should be given the same meaning as commonly understood by one of ordinary skill in the art to which this invention belongs.

One embodiment of the present invention relates to a dairy-based shelf-stable ready-to-drink beverage composition free from chemically modified gums comprising high acyl gellan gum, in an amount in the range of 0.01-0.120 weight-% (for example 0.01-0.045 weight-%), or 0.025-0.040 weight-% of the composition, and starch in an amount in the range of 0.5-5 weight-%, 1.0-5 weight-%, 1.5-5 weight-%, 2-4 weight-%, or 2.5-3 weight-% of the composition.

As a dairy based composition, the composition of the present invention comprises a dairy component. The dairy component provides the nutritional benefits of milk. For example, the dairy component can comprise milk, milk fat, milk powder, skim milk, dairy proteins, cream, and/or any combinations thereof. Examples of suitable dairy proteins are casein, caseinate, casein hydrolysate, whey, whey hydrolysate, whey concentrate, whey isolate, milk protein concentrate, milk protein isolate, micellar casein, sodium-, potassium- and/or calcium-caseinate and/or combinations thereof. Furthermore, the dairy protein may be, for example, sweet whey, acid whey, α-lactalbumin, β-lactoglobulin, bovine serum albumin, acid casein, α-casein, β-casein and/or γ-casein.

In an embodiment, the beverage comprises at least one of skim milk, whole pasteurized milk, skim milk powder, and cream. Preferably, the beverage comprises skim milk, cream and skim milk powder. In a preferred embodiment, the beverage does not contain added oil. Preferably, the dairy component does not contain fermented milk.

In an embodiment, the beverage comprises less than 4 weight-% of milk fat, such as from 0 to 3.8 weight-% of milk fat, preferably from 0.5 to 3.5 weight-% of milk fat (for example 2.0 to 2.5 weight-% of milk fat), such as 1 weight-%, 1.5 weight-%, 2.0 weight-%, or 3.5 weight-% of milk fat. In an embodiment, the fat content of the beverage is low enough so that the beverage could be considered as a skim milk beverage.

In an embodiment, the beverage comprises from 1.5 to 5 weight-% (for example 2 to 5 weight-% for further example 1.8 to 2 weight-%) of dairy proteins, for example from 2 to 3.9 weight-% of dairy proteins, and for further example from 2 to 3 weight-% of dairy proteins, such as 2 weight-%, 2.5 weight-%, 2.8 weight-%, 3.5 weight-%, or 3.9 weight-% of dairy protein. Dairy proteins have an impact on foamability and foam stability.

The composition of the present invention may also comprise a flavour component. The flavour component provides flavour to the beverage, in addition to the milk flavour which is provided at least in part by the dairy protein. The flavour component may comprise a sweetener, such as sugar (sucrose) or a non-caloric sweetener. For instance, the beverage may comprise from 0 to 5.5 weight-% of sugar. In an embodiment, the beverage has a "low sugar" content, meaning that it contains less than 4.5 g of added sugar per 100 g of the beverage. "Added sugar" refers to caloric mono- and di-saccharides added during manufacture of the beverage, such as glucose, sucrose, maltose, fructose, which are not naturally found in the coffee component. For instance, lactose is naturally found in milk, therefore, for the purpose of this disclosure, lactose is not taken into account in "added sugar".

The flavour component may also comprise a flavour ingredient selected from the group consisting but not limited to coffee, cocoa, tea, caramel, vanilla, cinnamon, cardamom, saffron, clove, almond, hazelnut, or combinations thereof.

The composition of the present invention comprises high acyl gellan gum and starch. These ingredients can be considered texture and stabilizer components. A texture and/or stabilizer component provides mouth-feel and viscosity, contributes to shelf-stability of the product at refrigeration and ambient temperatures, and helps maintaining the aerated texture of the beverage after shaking. The texture and/or stabilizer component reduces physical instability issues while providing a pleasant aerated mouthfeel after shaking. The texture and/or stabilizer component comprises high acyl gellan gum and starch in specific concentrations.

The present inventors were surprised to find, that if high acyl gellan gum and physically modified starch were used in the specific concentrations given above and in specific ratios, particular advantageous results were obtained. Hence, for example, the composition of the present invention may comprise high acyl gellan gum and starch in a weight ratio in the range of 1:8-1:500, 1:33-1:500, 1:40-1:150, or 1:50-1:100. For example, the composition of the present invention may comprise high acyl gellan gum and starch in a weight ratio in the range of 1:8-1:50.

The composition of the present invention may also comprise further texture components, such as pectin, locust bean gum, and or guar gum, for example. Also, here, particular advantageous results were obtained when these texture components were used in specific concentrations. As such, the composition of the present invention may further comprise locust bean (carob gum) in amounts ranging from 0 to 0.25 weight-%, pectin in amounts ranging from 0 to 1 weight-%, and/or guar gum in amounts ranging from 0 to 0.2 weight-%.

The composition of the present invention is free from chemically modified gums. This is a significant advantage of the present invention as it allows to comply with customer demand in view of cleaner label requirements.

The starch used in the framework of the present invention may be any physically modified starch. However, very good results were obtained when the starch was selected from the group consisting of physically modified rice starch, tapioca starch, potato starch, corn starch, and/or combinations thereof.

The starch may be any physically modified starch. The starch may be physically modified by a method selected from the group consisting of physical treatments, for example, thermal treatments, including those that produce pre-gelatinized and granular cold-water-swelling starches, heat-moisture treatments, annealing, microwave heating, osmotic pressure treatment, and heating of dry starch; and non-thermal treatments, including ultrahigh-pressure treatments, instantaneous controlled pressure drop, use of high-pressure homogenizers, dynamic pulsed pressure, pulsed electric field, freezing and thawing; and combinations thereof.

As a dairy-based shelf-stable ready-to-drink beverage composition, the composition of the present invention may contain liquid skim milk, whole milk, cream and/or combination of thereof. Milk is a white liquid produced by the mammary glands of mammals. All mammals, including humans, will normally produce milk to feed their offspring until they are ready for solid food. As such, milk is the first food provided to infants and is associated with numerous health benefits. Milk provides many nutrients which play an important role within the body throughout the different stages of life.

Around the world, health professionals recommend milk and dairy foods as a significant part of a healthy balanced diet.

Hence, in one embodiment of the present invention, the composition of the present invention may contain liquid skim milk, whole milk, cream and/or combination of thereof, for example in the range of 30-94.5 weight-%, 40-94 weight-%, 50-90 weight-% or 55-60 weight-%.

The inventors have found that the composition of the present invention is preferred by consumers, if the composition contains as flavour component cocoa, malt and/or coffee.

As such, one composition of the present invention comprises dairy proteins in an amount in the range of 2-5 weight-%, sugar in an amount in the range of 0-5.5 weight-%, cocoa in an amount in the range of 0.5-2 weight-%, gellan gum in an amount in the range of 0.015-0.045 weight-%, starch in an amount in the range of 1.5-5 weight-%, and water for the remaining weight-%.

Another composition of the present invention comprises dairy proteins in an amount in the range of 2-5 weight-%, barley malt extract in an amount in the range of 0.5-1.5 weight-%, sugar in an amount in the range of 0-5.5 weight-%, cocoa in an amount in the range of 0.5-2 weight-%, gellan gum in an amount in the range of 0.01-0.045 weight-%, starch in an amount in the range of 1.5-5 weight-%, and water for the remaining weight-%.

A further composition of the present invention comprises from 2-4 weight-% of dairy proteins; 0 to 4 weight-% of milk fat; 0 to 5.5 weight-% of added sugar; 0.5 to 1.5 weight-% coffee (for example liquid coffee, for example liquid coffee having a total solids content between 10 and 13%, for further example liquid cold brew coffee); 0.01 to 0.120 (for example 0.01 to 0.045) weight-% of gellan gum; 0.5 to 5 (for example 1 to 5, or 2 to 5) weight-% starch; a buffering agent in the range of 0.01 to −0.20 weight-% (for example a natural buffering agent), and the remainder to 100 weight-% of water. For example, this beverage composition may comprise from 50 to 90 weight-% of milk comprising up to 4 weight-% of milk fat; 0 to 5.5 weight-% of added sugar; 0.8 to 1.5 weight-% coffee (for example liquid coffee, for example liquid coffee having a total solids content between 10 and 13%, for further example liquid cold brew coffee); 0.025 to 0.120 (for example 0.025 to 0.045) weight-% of hydrocolloids from natural sources selected from the group comprising high acyl gellan gum, pectin, guar, locus gum and/or combinations thereof; 0.02 to −0.2 weight-% buffering agent (for example a natural buffering agent); 0.5 to 5 weight-% starch (for example 1 to 5 weight-% starch for further example 2 to 4 weight-% starch); and the remainder to 100 weight-% of water; wherein said beverage has an apparent viscosity of 30 to 100 mPa·s at 4° C.; the headspace represents from 15 to 40 vol.-% of the volume of the container, and wherein said beverage has a shelf life of at least 6 months at 20° C.

The coffee can include one or more coffee ingredients or coffee substitute ingredients. In a preferred embodiment, the composition does not contain coffee substitute ingredients. In a preferred embodiment, the composition comprises a coffee component, such as coffee extract. Coffee extract may be provided as liquid or viscous coffee concentrate, or as instant powdered coffee, such as spray-dried powdered coffee or freeze-dried powdered coffee. The beverage may comprise from 0.5 to 2 weight-%, preferably from 0.8 to 1.5 weight-% of coffee, such as soluble powdered coffee, for example. The beverage may comprise from 0.5 to 2 weight-%, preferably from 1.0 to 1.5 weight-% of coffee, such as liquid coffee having a total solids content between 10 and 13%.

For example, the coffee may be soluble coffee, micronized coffee particles, coffee extract, coffee concentrate and combinations thereof. Further, the coffee may comprise *Arabica* coffee, *Robusta* coffee or combination of thereof.

Advantageously, the beverage of the invention is stable and has good foaming properties without requiring emulsifiers that may be badly perceived by consumers. In an embodiment, the beverage contains less than 0.001 wt. % of monoacylglycerols (MAG), diacylglycerols (DAG) and diacetylated tartaric acid esters of monoglycerides (DATEM). For example, the beverage may contain less than 0.0001 wt. % of MAG, DAG and DATEM. The beverage of the invention may be free from added MAG, DAG and DATEM. By the term "free from added" is meant that the beverage composition does not contain any MAG, DAG or DATEM which have been added as such. A beverage free from added MAG, DAG and DATEM may contain minor amounts of these emulsifiers which are present as minor impurities of one or more of the ingredients of the beverage. For example, vegetable oils may naturally contain small amounts of monoacylglycerols and diacylglycerols. The beverage of the invention may be free from MAG, DAG and DATEM. Monoacylglycerols are also known as monoglycerides and diacylglycerols are also known as diglycerides.

In an embodiment, the beverage of the invention contains less than 0.001 wt. % (for example less than 0.0001 wt. %) of low molecular weight emulsifiers. In the context of the present invention the term low molecular mass emulsifiers refers to emulsifiers with a molecular mass below 1500 Dalton. Casein based proteins according to the invention are not low molecular mass emulsifiers. The beverage of the invention may be free from added low molecular mass emulsifiers, for example the beverage of the invention may be free from low molecular mass emulsifiers. Low molecular mass emulsifiers include, but are not limited to, monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, phospholipids, galactolipids, and sucrose esters of fatty acids.

In one embodiment a beverage composition according to the invention is free from added monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, phospholipids, galactolipids, and sucrose esters of fatty acids. For example it may be free from added monoacylglycerols, diacylglycerols, diacetylated tartaric acid esters of monoglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, succinic acid esters of monoglycerides and diglycerides, lactic acid esters of monoglycerides and diglycerides, lysophospholipids, and sucrose esters of fatty acids.

As a ready-to-drink composition, the composition of the present invention is provided packaged and ready for consumption. The composition is advantageously provided in a closed container such as a laminated cardboard container, a beverage pouch, a jar, a tin, a bottle, or a can, for example. Advantageously, the composition is added into the container by aseptic filling or retorting. Hence, the composition of the present invention may be an aseptic composition. This has the advantage of an increased shelf life.

To allow gas incorporation after physically shaking the beverage container, the container needs to contain a headspace above the beverage composition. The inventors have found that optimal gas incorporation into the beverage after shaking is obtained, if the beverage composition is provided in a closed container with a headspace, wherein the headspace represents from 15 to 40 vol. %, 18 to 35 vol. % or to 35 vol. % of the volume of the container.

The inventors have found that if the headspace is too small, then the closed container does not contain enough gas to provide a pleasant aerated texture upon shaking. For instance, it was found that a headspace of less than 15 vol. % was too low to provide a pleasant aerated texture after shaking. Therefore, the headspace represents preferably at least 15% by volume (vol. %) of the volume of the container.

On the other hand, if the headspace is too large, it may have several undesirable consequences. First, the consumer could consider that the container is not filled enough. Second, a large headspace can only be provided with a large container. This increases the cost of packaging and the amount of waste. Third, the inventors have found that if the headspace is too large, then the container tends to squash itself over shelf life. Without wishing to be bound by theory, the inventors believe this is due to oxygen consumption. During shelf life, the oxygen in the headspace reacts with the beverage, especially when the beverage comprises a coffee component. This reduces the internal pressure in the headspace, thereby provoking a "vacuum" effect. For instance, containers with a headspace of above 40 vol.-% showed an unacceptable vacuum effect and squashing over shelf life. This could be solved by flushing the headspace with nitrogen for instance, during filling and sealing of the container. It was found that a good balance is achieved between these undesirable consequences, industrialisation considerations and the need to provide sufficient gas for aeration when the headspace represents up to 40 vol.-% of the volume of the container.

In an embodiment, the headspace represents from 15 to 40 vol.-% of the volume of the container. In other words, if the container has a volume of 100 mL, then the headspace represents from 15 mL to 40 mL, and the remainder is the beverage (60 mL to 85 mL). Preferably, the headspace represents from 20 to 32 vol.-% of the volume of the container, more preferably, from 25 to 30 vol.-% of the volume of the container.

When the container is a PET bottle, it may be desirable to provide it with common strengthening features, such as ribs.

In an embodiment, the bottle has a volume of 240 ml. Preferably, the bottle contains one serving of the beverage composition. For instance, one serving represents from about 150 to 180 mL of beverage before shaking.

Particular good results in terms of bubble size in the aerated beverage and also in terms of shelf like were obtained, when the headspace was comprising gas selected from the group consisting of nitrogen, argon, air and/or combinations of thereof. Usually, maintaining a foamed texture over shelf life requires the use of relatively high amounts of additives to stabilise the foam. However, additives are not always accepted by consumers. In addition, the mouth-feel of shelf-stable foamed beverage may be less pleasant than that of a freshly prepared aerated beverage. Rather than ensuring that the beverage retains an aerated texture over the whole shelf life, the inventors have reversed the problem and now provide a non-aerated beverage, which has a pleasant aerated texture during consumption by shaking the beverage before consumption. The aerated texture is obtained by shaking the beverage in its closed container, for instance by hand. Shaking by hand may be done by holding the container in the hand, and bending and stretching the arms several times, for instance from 3 to 15 times. Generally, about 5 to 10 movements are sufficient to generate a pleasant aerated texture in the beverage. In one embodiment, the beverage composition of the present invention retains a pleasant foam for at least 10 minutes, for example, after shaking of the refrigerated beverage at 4° C.

An advantage is that it is not necessary to be concerned about stability of the aeration. Only the shelf stability of the non-aerated beverage is a concern. In an embodiment, the beverage is shelf-stable during 6 months at 20° C., more preferably during 9 months at 20° C. In another embodiment, the beverage is shelf-stable during 6 months at 20° C. and 30° C. or 1 month at 38° C. A relatively long shelf stability are achieved thanks to specific stabilizers and to the aseptic manufacturing conditions, together with sterilisation or retorting, of the beverage.

The composition of the beverage, in particular the selection of hydrocolloids, was developed so that the bubbles remain distributed in the whole volume of the beverage during consumption to provide a pleasant mouth-feel. The fact that the bubbles are distributed in the whole volume of the beverage provides a pleasant aerated texture. For instance, the refrigerated beverage retains an aerated texture during at least 10 minutes after shaking. Assessment of the aerated texture was performed by a trained sensory panel.

The pH value of the composition of the present invention was found to have an effect on shelf life as well as on taste profile and aeration stability. To adjust for an optimal pH value a buffering agent may be used. The inventors have found that the composition of the present invention should have a pH value in the range of 6.6-7.0 in order to achieve good results. This can well be achieved, if the composition of the present invention comprises buffering agent, for example 0.02 to −0.20 weight-%, 0.025 to −0.15 weight-%, or 0.03 to −0.12 weight-% buffering agent. The buffering agent may, for example, be selected from the group consisting of sodium bicarbonate, potassium bicarbonate, sodium citrate, potassium citrate and combinations thereof. In one embodiment of the present invention, the buffering agent is sodium bicarbonate, for example sodium bicarbonate from a natural source. The buffering agent may be a natural buffering agent, for example a buffering agent from a natural source. In the context of the present invention the term buffering agent refers to a material used to control pH. The buffer formed by one or more buffering agents may comprise a weak acid and its conjugate base, but is not limited to this definition. The composition may comprise a basic compound as a buffering agent or an acidic compound as a buffering agent. For example, in the case where the components of the composition cause it to be acidic (e.g. in the case of a composition comprising coffee), a basic compound may be added as a buffering agent.

The dairy-based shelf-stable ready-to-drink beverage composition of the present invention may be stored at ambient conditions or at chilled conditions. The composition may also be consumed at ambient or at chilled conditions.

Storing the composition of the present invention at ambient conditions has the advantage that no chilling is required and energy otherwise required for chilling can be saved. This contributes to an advantageous environmental footprint.

Storing the composition of the present invention at chilled conditions has the advantage that it can be removed from storage and immediately be consumed for an increased refreshing effect.

Consuming the composition at ambient conditions has the advantage that the composition can be consumed everywhere and at any time without the need for refrigeration.

Hence, the composition of the present invention may be to be stored at ambient and to be consumed at ambient conditions. Alternatively, the composition of the present invention may be to be stored at ambient and to be consumed at chilled conditions. Further, the composition of the present invention may be to be stored at chilled and to be consumed at chilled conditions.

One advantage of the subject matter of the present invention is that the composition of the present invention has a long shelf life. As such, the composition of the present invention may have a shelf life in the range of about 2-12 months, about 4-10 months, or about 6 months at ambient conditions. It may also have a shelf life in the range of about 6-12 months, about 8-10 months, or about 6 months at chilled conditions. For example, the composition of the present invention have a shelf life of at least 1 month at 38° C., at least 6 months at 30° C., and at least 6 months at 20° C.

The composition of the present invention is shelf-stable at ambient temperatures. An advantage is that the packaged product may be stored at ambient temperatures, in warehouses, in shops or at home by consumers. In shops, a few containers can be stored in refrigerators for on-the-go consumption, so that the consumer can directly prepare a refrigerated aerated beverage. At home, consumers can keep the packaged product at ambient temperature and store a few containers in their refrigerator for consumption in the day for instance. This saves room in the refrigerator.

The aerated texture may be obtained by shaking the beverage in the closed container, for instance by hand. When preparing the aerated beverage in that manner, percent of gas incorporated of 7 and 25% can be achieved, usually of about 15 to 18 The percent of incorporated gas is measured as follows: a volume V of the beverage is measured before shaking ($V_o$). The product is shaken 10 times by hand. The volume V of the shaken beverage with air is also measured ($V_f$). The volume percent of incorporated gas (in %) is the result of following equation:

$$\text{Gas incorporated} = \frac{V_f - V_o}{V_f} \times 100$$

where:
$V_o$=initial volume of beverage (non-aerated beverage)
$V_f$=final volume of shaken beverage (aerated beverage)

The volume of the beverage may for example be measured using a graduated container, such as the container in which the beverage is shaken on which graduations have been marked corresponding to volume. The product may be shaken, measured and stored during the measurement at a product temperature of 4° C. One advantage of the subject matter of the present invention is that the compositions described provide a rich and creamy texture which is achieved through aeration by incorporating gas into the composition through shaking. Hence, the rich and creamy texture is achieved while high indulged caloric densities can be avoided. As such, the compositions of the present invention may have a viscosity before shaking in the range of 30-100 mPa·s, 55-90 mPa·s, or 60-80 mPa·s. For example the viscosity may be apparent viscosity measured using double-gap geometry with temperature from 4° to 40° C. and then from 40° to 4° C. at a constant shear rate=75 $s^{-1}$ and a heating/cooling rate=2° C./min. The composition of the present invention may have aeration after shaking (volume % of incorporated gas) in the range of 10-25%, 12-20% or 15-18%, with an aeration stability of at least 5 minutes, at least 10 minutes, at least 15 minutes or at least 30 minutes. The aeration stability time is the time for which the range of aeration after shaking is maintained, for example a composition with an aeration after shaking in the range of 10-25% and an aeration stability of at least 5 minutes has a volume of incorporated gas in the range 10-25% immediately after shaking, the volume of incorporated gas remaining in the range 10-25% for up to 5 minutes after shaking.

In one embodiment of the present invention, the composition has an apparent viscosity of 30 to 100 mPa·s at 4° C. The measurements were conducted with a Physica MCR 501 rheometer (Anton Paar GmbH, Austria), using a double-gap geometry (DG26.7). Apparent viscosity was measured from 4° to 40° C. and then from 40° to 4° C. at a constant shear rate=75 $s^{-1}$ and a heating/cooling rate=2° C./min.

In a further embodiment of the present invention, the invention relates to a process for preparing a composition in accordance with the present invention comprising the following steps:

Mix dairy proteins, starch, high-acyl gellan gum and all other ingredients; homogenize the mixture at a total pressure in the range from 135-300 bars and at a temperature in the range from 60-80° C.; fill the homogenized mixture into a container and close the container; retort the filled and closed container at a temperature in the range from 110-130° C., 115-125° C. or 120-122° C. for a time in the range of 5-25 min. 10-20 min. or 13-17 min; and allow the retorted container to cool to a temperature below 35° C., below 30° C. or below 25° C.

The containers to be used in this process must be containers that will withstand the conditions during the retorting step. For example, cans or bottles may be used.

Alternatively, after the container may be filled aseptically with a composition that was UHT treated before filling.

Hence, in a further embodiment of the present invention, the invention relates to a process for preparing a composition in accordance with the present invention comprising the following steps:

Mix dairy proteins, starch, high-acyl gellan gum and all other ingredients; pre-heat the mixture to a temperature in the range of 50-100° C., 55-90° C. or 60-80° C.; sterilize the pre-heated mixture at UHT conditions at 135-170° C., 135-160° C. or 135-150° C. for 2-60 seconds, 3-45 seconds or 3-30 seconds; homogenize the mixture at total pressure ranging from 135-300 bars and temperature ranging from 60-80° C.; allow the UHT treated composition to cool to a temperature below 35° C., below 30° C. or below 25° C.; and aseptically fill UHT treated beverages into aseptic containers.

The homogenization may be carried out in two steps comprising the first step wherein liquid mixture is exposed to a pressure in the range of 100 to 250 bars, followed by a second step with pressure in the range of 35 to 50 bars.

For example, a beverage composition in accordance with the present invention may be manufactured by providing a standardised liquid milk composition, which may comprise up to 4 weight-% of milk fats, and from 1.5 to 5 weight-% (for example 2 to weight-%) of dairy proteins. The mix composition may then be prepared by mixing liquid milk, and/or milk cream and/or milk powder. Flavour and sweetener components, such as sugar and a coffee component, and the texture component, may also be mixed into the liquid mix composition. For instance, mixing may be done at 10° C., during 60 minutes. Then, the pH of the mix may be adjusted with a buffering agent, such as sodium bicarbonate and dipotassium phosphate. The pH may be adjusted to a value in the range of 6.5 to 7.0, for example 6.6 to 6.9. For beverage compositions comprising a coffee component the pH may fall during storage. Coffee contains ester compounds, particularly chlorogenic acid lactones, which will hydrolyze and become acid in water. Therefore, acidity increases and pH drops during storage. It is advantageous that the compositions of the invention comprising coffee have good acid stability and maintain a pH of 6.5 to 7.0 during storage. At a pH below 6.5 there is a risk of protein denaturation, for example milk protein denaturation. The composition may then be pre-heated at 60-80° C. prior to sterilisation typically at 141-143° C. for 5 seconds. Sterilisation removes microbiological contamination from the composition. Alternative heat-treatments are known to the person of ordinary skill in the art. Then the sterilised liquid milk composition may be cooled to about 75° C. prior to homogenisation under a typical pressure of 150/50 bar in a conventional homogeniser. Homogenisation further disperses the fat component and other ingredients. Then the composition may be cooled, and filled into a container, such as a cup or a bottle.

Filling may be done under aseptic conditions. In an embodiment, filling may be performed under a controlled atmosphere, to flush oxygen out of the headspace. For instance, as a controlled atmosphere a nitrogen atmosphere may be used. The container is then sealed. When the container is a bottle, sealing can be done with a standard screw lid. When the container is a cup, sealing can be done with a standard foil seal.

In another embodiment, sterilization can be performed by retorting. In this case after mixing ingredients, liquid may be pre-heated at 60-80° C., homogenised under a typical pressure of 150/50 bar in a conventional homogeniser, filled in cans or glass containers, retorted at 121° C. for 15 min, and cooled at 25° C. or lower temperature.

Optionally, the composition of the present invention may be refrigerated prior to shaking, so that the beverage is chilled for consumption. The aerated beverage is then ready for consumption.

Although preferred embodiments have been disclosed in the description with reference to specific examples, it will be recognised that the invention is not limited to the preferred embodiments. Various modifications may become apparent to those of ordinary skill in the art and may be acquired from practice of the invention. It will be understood that the materials used and the details may be slightly different or modified from the descriptions without departing from the methods and compositions disclosed and taught by the present invention.

EXAMPLES

Example 1

Several coffee beverages were prepared by mixing liquid or powder milk or water, with sugar and other flavour ingredients, the other dairy based ingredients, the texture/stabilizer components (high acyl gellan gum, and/or pectin, locust bean gum, guar gum) and a buffering agent. The mixes had a pH of about 6.7. The mix was then pre-heated to 75° C., then sterilised at 143° C. during 5 seconds, then cooled to 75° C. prior to homogenisation under 150/50 bars. Then the liquid beverage was cooled to about 10° C., then aseptically filled into bottles. The bottles have a total volume of 8 oz (236 mL), and they are filled with 180 mL of coffee beverage. This leaves a headspace of about 60 mL, which corresponds to about 24 vol. %. The manufacture of the liquid coffee beverage was done under aseptic conditions, at atmospheric pressure.

Example 2. Reference 1

A beverage was prepared by mixing 90 kg milk, 5 kg sugar, 0.5 kg of microcrystalline cellulose co-processed with carboxymethyl cellulose and carrageenan, 0.01 kg high acyl gellan gum under high agitation. Then 1 kg soluble coffee were added to the above slurry under agitation. Further, 0.1 kg of sodium hydroxide and remain water to obtain 100 kg total weight was added to the tank under agitation. The mixture was then pre-heated to about 75° C., sterilized at 143° C. for 5 seconds and then flash cooled to 75° C., homogenized using two step homogenization at 150/50 bars. The liquid beverage was cooled below 15° C., and then aseptically filled into 8 oz (about 236 mL) bottles having 30% headspace.

Example 3

A beverage was prepared by mixing 90 kg milk, 5 kg sugar, 0.03 kg high acyl gellan gum under high agitation. Then 2 kg starch and 0.8 kg soluble coffee were added to the above slurry under agitation. Further, 0.08 kg of sodium bicarbonate and remain water to obtain 100 kg total weight was added to the tank under agitation. The mixture was then pre-heated to about 75° C., sterilized at 143° C. for 5 seconds and then flash cooled to 75° C., homogenized using two step homogenization at 150/50 bars. The liquid beverage was cooled below 15° C., and then aseptically filled into 8 oz (about 236 mL) bottles having 30% headspace.

Further, the product showed a good shelf life physical stability with no phase separation, sedimentation, or syneresis.

Unique indulgent, creamy texture/mouthfeel was obtained after product shaking. Product performance after shaking was compared with the reference and improvement in foamy mouthfeel and body/thickness was found.

Example 4

A beverage was prepared as in Example 3 but using 3 kg starch.

Figure 1:
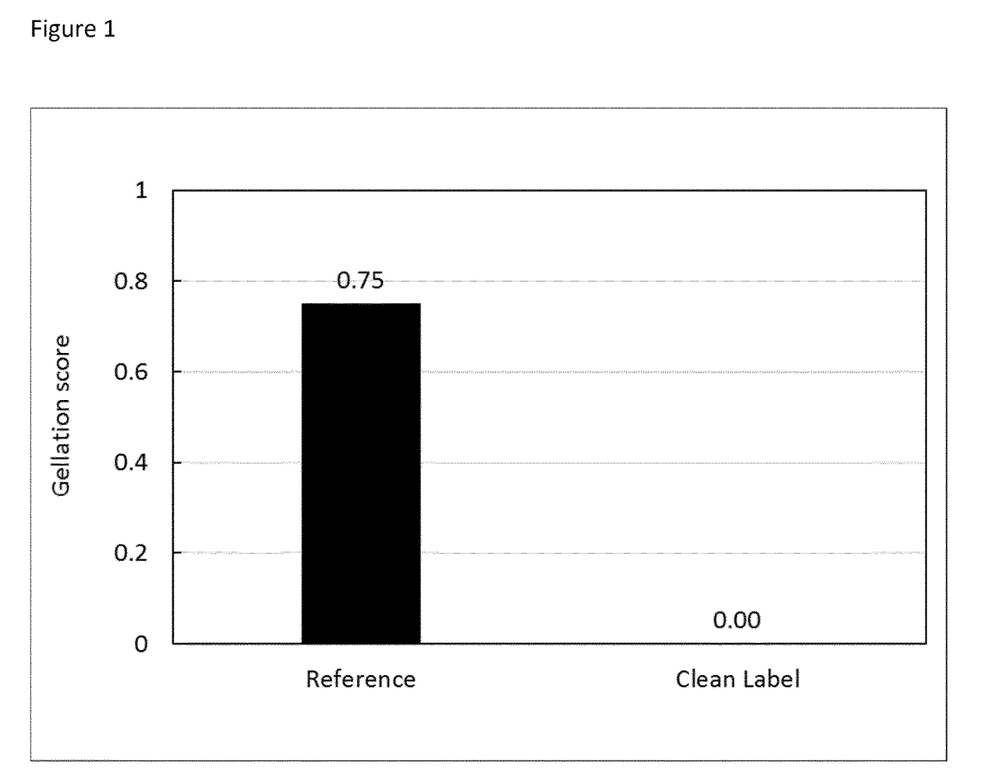
FIG. 1 shows gelation score of the reference and clean label beverages on a 0-5 scale after 9 months storage at 20° C.

Further, the product showed a good shelf life physical stability with no phase separation, sedimentation, or syneresis. Further, no age gelation was found during the storage (FIG. 1).

Unique indulgent, creamy texture/mouthfeel was obtained after product shaking. Product performance after shaking was compared with the reference and significant improvement in foamy mouthfeel and body/thickness was found. Further, product viscosity was increased as compare to the reference.

Example 5

A beverage was prepared as in Example 3 but using 0.025 kg high acyl gellan gum and 0.2 kg guar gum.

The product showed a good shelf life physical stability with no phase separation, sedimentation, gelation or syneresis.

Unique indulgent, creamy texture/mouthfeel was obtained after product shaking. Product performance after shaking was compared with the reference and significant improvement in foamy mouthfeel and body/thickness was found.

Example 6. Reference 2

A beverage was prepared by mixing 90 kg milk, 5 kg sugar, 0.5 kg of microcrystalline cellulose co-processed with carboxymethyl cellulose and carrageenan, 0.01 kg high acyl gellan gum under high agitation. Then 0.5 kg cooked cocoa (45 min at 90° C.) were added to the above slurry under agitation. Further, 0.04 kg of sodium hydroxide and remain water to obtain 100 kg total weight was added to the tank under agitation. The mixture was then pre-heated to about 75° C., sterilized at 143° C. for 5 seconds and then flash cooled to 75° C., homogenized using two step homogenization at 2000/500 psi. The liquid beverage was cooled to about 10° C., and then aseptically filled into 8 oz (about 236 mL) bottles having 30% headspace.

Example 7

A beverage was prepared by mixing 90 kg milk, 5 kg sugar, 0.03 kg high acyl gellan gum under high agitation. Then 2 kg starch and 1 kg cooked cocoa (45 min at 90° C.) were added to the above slurry under agitation. Further, 0.05 kg of sodium bicarbonate and remain water to obtain 100 kg total weight was added to the tank under agitation. The mixture was then pre-heated to about 75° C., sterilized at 143° C. for seconds and then flash cooled to 75° C., homogenized using two step homogenization at 2000/500 psi. The liquid beverage was cooled to about 10° C., and then aseptically filled into 8 oz (about 236 mL) bottles having 30% headspace.

Further, the product showed a good shelf life physical stability with no phase separation, gelation, sedimentation, or syneresis.

Figure 2:
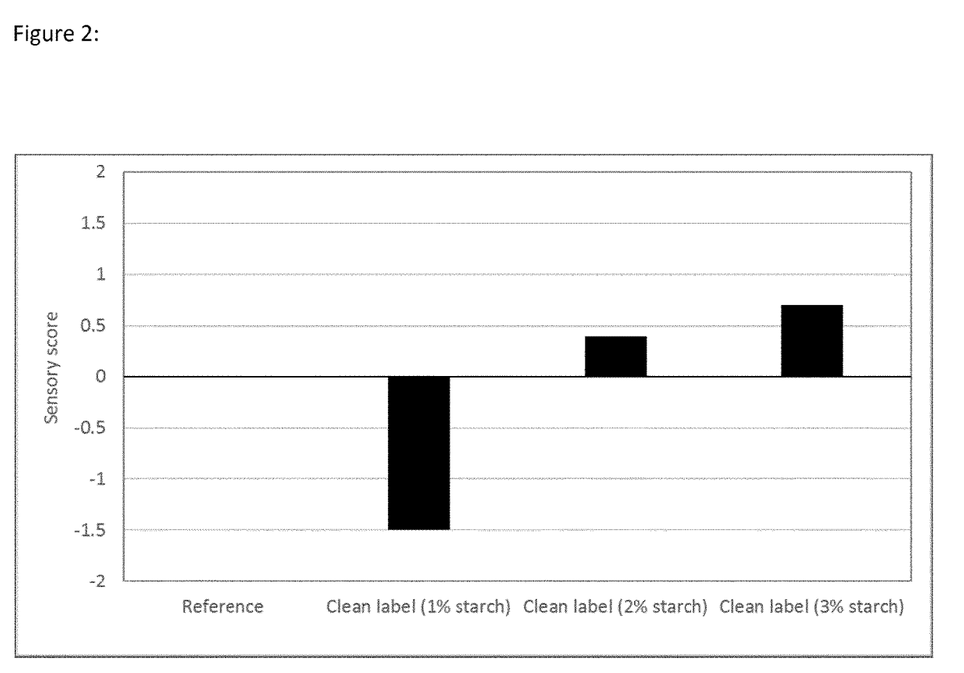
FIG. 2 shows the sensory texture/mouthfeel score for clean label beverages with 1, 2 and 3% starch as compared to the reference (Non-clean label).

Unique indulgent, creamy texture/mouthfeel was obtained after product shaking. Product performance after shaking was compared with the reference and improvement in foamy mouthfeel and body/thickness was found (FIG. 2)

Example 8

A beverage was prepared as in Example 7 but using 3 kg starch.

Further, the product showed a good shelf life physical stability with no phase separation, gelation, sedimentation, or syneresis.

Figure 3:
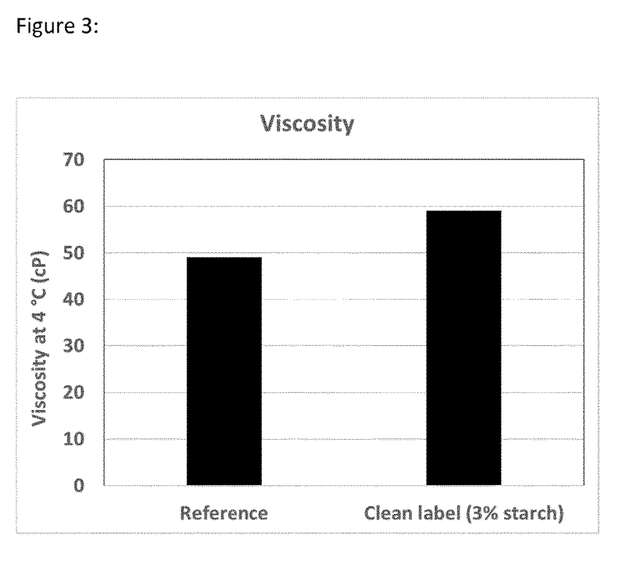
FIG. 3 shows the viscosity of clean label beverage (3% starch) as compared to the reference (Non-clean label)

Unique indulgent, creamy texture/mouthfeel was obtained after product shaking. Product performance after shaking was compared with the reference and significant improvement in foamy mouthfeel and body/thickness was found (FIG. 2). Further, product viscosity was increased as compare to the reference (FIG. 3).

Example 9

An aseptic ready to drink foaming beverage was prepared as in Example 7 but comprising 1 kg of starch.

Good aeration was obtained after shaking the beverage; however, a thin texture/mouthfeel was obtained after product tasting (FIG. 2).

Example 10

Figure 4:
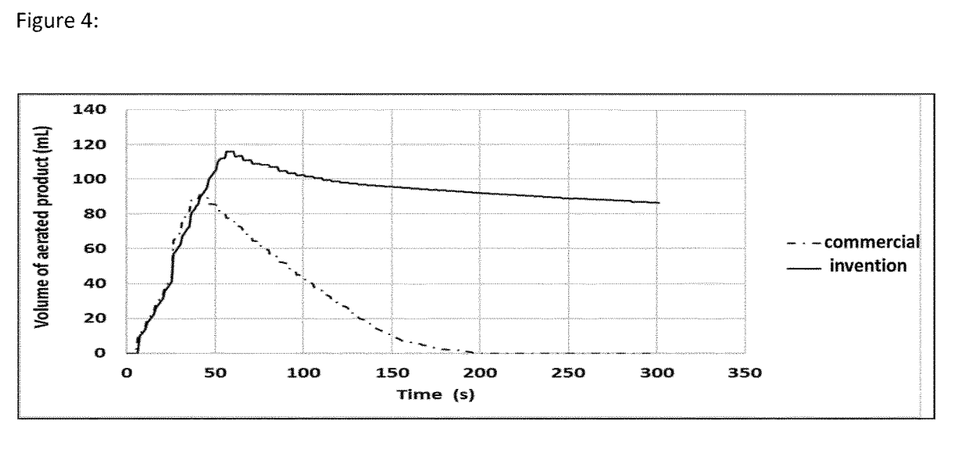
FIG. 4 shows air incorporation and aeration stability of the commercial reference versa the present invention

Aeration of a reference sample available in market containing Coffee (Filtered Water, Coffee), Skim Milk, micellar casein (milk protein), Cane Sugar, Cream, Natural X Flavourings, Sea Salt, Gellan Gum was compared with the product of the present invention. Evaluation of air incorporation and aeration stability of the commercial and invention beverages showed that the product of the invention has significantly higher volume of incorporated air and significantly higher aeration stability over time (FIG. 4). Further, sensory evaluation after hand shaking showed that the commercial beverage was low body coffee with top foam which disappeared very fast, therefore was not homogeneously aerated beverage. On opposite, the product of the invention had pleasant thick indulgent texture, homogeneous throughout the whole aerated beverage, and with very high aeration stability.

The invention claimed is:

1. A dairy-based shelf-stable ready-to-drink beverage composition free from chemically modified gums, the dairy-based shelf-stable ready-to-drink beverage composition consisting of:
   high acyl gellan gum in an amount in the range of 0.01-0.045 wt. %;
   starch in an amount in the range of 1.5-5 wt. %;
   dairy proteins in an amount in the range of 2-5 wt. %;
   barley malt extract in an amount in the range of 0.5-1.5 wt. %;
   sugar in an amount in the range of 0-5.5 wt. %;
   cocoa in an amount in the range of 0.5-2 wt. %;
   a buffering agent added to obtain the dairy-based shelf-stable ready-to-drink beverage composition at pH between 6.5 to 7.0; and
   water for the remaining wt. % of the dairy-based shelf-stable ready-to-drink beverage composition,
   wherein the dairy-based shelf-stable ready-to-drink beverage composition is capable of being aerated upon shaking, wherein the dairy-based shelf-stable ready-to-drink beverage composition has aeration after shaking in the range of 10-30%, with an aeration stability of at least 5 minutes, wherein the dairy-based shelf-stable ready-to-drink beverage composition does not contain carboxymethyl cellulose.

2. The dairy-based shelf-stable ready-to-drink beverage composition of claim 1, wherein the high acyl gellan gum is present in an amount in the range of 0.025-0.040 wt. % and the starch is present in an amount in the range of 2-4 wt. % of the dairy-based shelf-stable ready-to-drink beverage composition.

3. The dairy-based shelf-stable ready-to-drink beverage composition of claim 1, wherein the starch is physically modified starch selected from the group consisting of rice starch, tapioca starch, potato starch, corn starch, and combinations thereof.

4. The dairy-based shelf-stable ready-to-drink beverage composition of claim 1, wherein the dairy proteins are present in an amount in the range of 2-3.9 wt. % of the dairy-based shelf-stable ready-to-drink beverage composition.

5. The dairy-based shelf-stable ready-to-drink beverage composition of claim 1, wherein:
   the dairy proteins are present in an amount in the range of 2-3 wt. %;
   the cocoa is present in an amount in the range of 0.8-1.5 wt. %;
   the high acyl gellan gum is present in an amount in the range of 0.025-0.040 wt. %; and
   the starch is present in an amount in the range of 2-4 wt. %.

6. The dairy-based shelf-stable ready-to-drink beverage composition of claim 1, wherein:
   the dairy proteins are present in an amount in the range of 2-3 wt. %;
   the sugar is present in an amount in the range of 0-4.5 wt. %;
   the cocoa is present in an amount in the range of 1.0-1.5 wt. %;
   the high acyl gellan gum is present in an amount in the range of 0.025-0.040 wt. %; and
   the starch is present in an amount in the range of 2.5-3 wt. %.

7. The dairy-based shelf-stable ready-to-drink beverage composition of claim 1, wherein:
   the dairy proteins are present in an amount in the range of 2-3 wt. %;
   added sugar is present in an amount in the range of 0-4.5 wt. %;
   the high acyl gellan gum is present in an amount in the range of 0.025-0.040 wt. %;
   the starch is present in an amount in the range of 2.5-3 wt. %; and
   the buffering agent is present in an amount in the range of 0.01-0.20 wt. %.

8. The dairy-based shelf-stable ready-to-drink beverage composition of claim 1 having an apparent viscosity before shaking in the range of 30-100 mPa·s.

9. The dairy-based shelf-stable ready-to-drink beverage composition of claim 1 being provided in a closed container with a headspace, wherein the headspace represents from 15 to 40 vol. %, of the volume of the closed container.

10. The dairy-based shelf-stable ready-to-drink beverage composition of claim 9, wherein the headspace comprises a gas.

11. The dairy-based shelf-stable ready-to-drink beverage composition of claim 1, wherein the buffering agent is present in an amount in the range of 0.01-0.20 wt. % of the dairy-based shelf-stable ready-to-drink beverage composition.

12. The dairy-based shelf-stable ready-to-drink beverage composition of claim 11, wherein the buffering agent is selected from the group consisting of sodium bicarbonate, potassium bicarbonate, sodium citrate, potassium citrate and combinations thereof.

13. A process for preparing a composition consisting of dairy proteins, starch, high acyl gellan gum, barley malt extract, sugar, cocoa, a buffering agent and water, the process comprising:

mixing the dairy proteins in an amount in the range of 2-5 wt. % of the composition, the starch in an amount in the range of 1.5-5 wt. % of the composition, the high acyl gellan gum in an amount in the range of 0.01-0.045 wt. % of the composition, the barley malt extract in an amount in the range of 0.5-1.5 wt. % of the composition, the sugar in an amount in the range of 0-5.5 wt. %, the cocoa in an amount in the range of 0.5-2 wt. % of the composition, and the water for the remaining wt. % of the composition to form a mixture;

homogenizing the mixture at a total pressure in the range from 135-300 bars and at a temperature in the range from 60-80° C.;

filling the homogenized mixture into a container and closing the container;

retorting the filled and closed container at a temperature in the range from 110-130° C., for a time in the range of 5-25 minutes, allowing the retorted container to cool to a temperature below 35° C. to form the composition, wherein the composition does not contain carboxymethyl cellulose.

14. A process for preparing a composition free from chemically modified gums, the composition consisting of dairy proteins, starch, high acyl gellan gum, barley malt extract, sugar, cocoa, a buffering agent and water, wherein the buffering agent is added to obtain the composition at pH between 6.5 to 7.0, wherein the composition does not contain carboxymethyl cellulose, wherein the composition is capable of being aerated upon shaking, wherein the composition has aeration after shaking in the range of at least 10-30%, with an aeration stability of at least 5 minutes, the process comprising:

mixing the dairy proteins in an amount in the range of 2-5 wt. % of the composition, the starch in an amount in the range of 1.5-5 wt. % of the composition, the high acyl gellan gum in an amount in the range of 0.01-0.045 wt. % of the composition, the barley malt extract in an amount in the range of 0.5-1.5 wt. % of the composition, the sugar in an amount in the range of 0-5.5 wt. % of the composition, the cocoa in an amount in the range of 0.5-2 wt. % of the composition, the buffering agent in an amount in the range of 0.01 to −0.20 wt. % of the composition and the water for the remaining wt. % of the composition to form a mixture;

pre-heating the mixture to a temperature in the range of 50-100° C.;

sterilizing the pre-heated mixture at UHT conditions at 135-170° C., for 2-60 seconds;

homogenizing the mixture at a total pressure ranging from 135-300 bars and at a temperature ranging from 60-80° C.;

allowing the UHT treated mixture to cool to a temperature below 35° C.; and aseptically filling the UHT treated mixture in an aseptic container to form the composition.

15. The dairy-based shelf-stable ready-to-drink beverage composition of claim 1, wherein the buffering agent is present in an amount in the range of 0.02-0.15 wt. % of the dairy-based shelf-stable ready-to-drink beverage composition.

16. The dairy-based shelf-stable ready-to-drink beverage composition of claim 1, wherein the buffering agent is present in an amount in the range of 0.03-0.12 wt. % of the dairy-based shelf-stable ready-to-drink beverage composition.

17. The process of claim 13, wherein the composition is a shelf-stable ready-to-drink beverage.

18. The process of claim 14, wherein the composition is a shelf-stable ready-to-drink beverage.

19. The dairy-based shelf-stable ready-to-drink beverage composition of claim 1, wherein the buffering agent is sodium bicarbonate.

20. The dairy-based shelf-stable ready-to-drink beverage composition of claim 1, wherein the dairy-based shelf-stable ready-to-drink beverage composition consists of the dairy proteins, the starch, the high acyl gellan gum, the barley malt extract, the sugar, the cocoa, sodium bicarbonate and the water.

* * * * *